Oct. 26, 1937.  F. LAGO  2,097,070
PROTECTING LOCK FOR DOG COLLARS AND LICENSE PLATES
Filed May 26, 1936
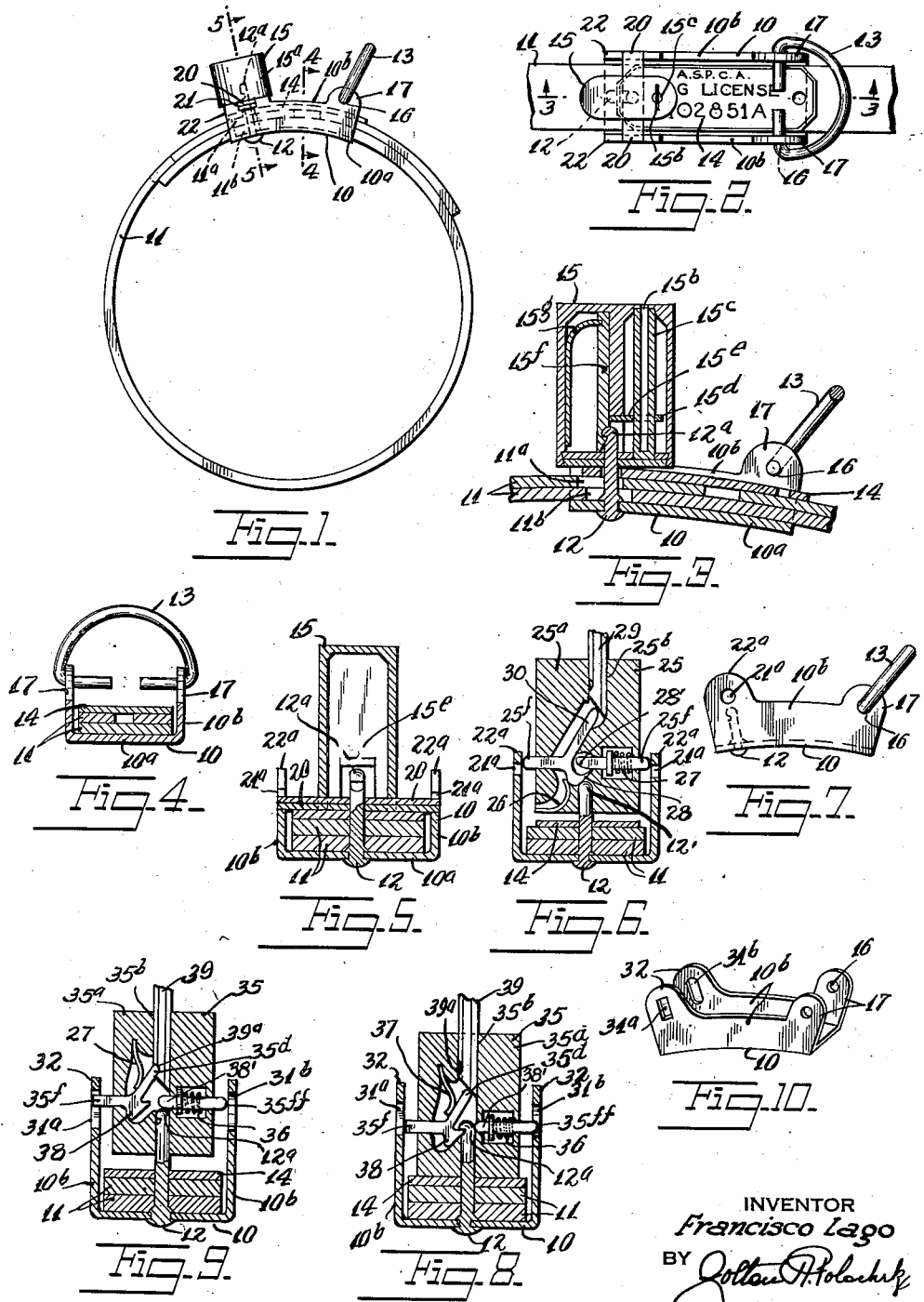
INVENTOR
Francisco Lago
BY
ATTORNEY Patented Oct. 26, 1937

2,097,070

UNITED STATES PATENT OFFICE 2,097,070

PROTECTING LOCK FOR DOG COLLARS AND LICENSE PLATES

Francisco Lago, Port Richmond, N. Y.

Application May 26, 1936, Serial No. 81,794

6 Claims. (Cl. 40—15)

This invention relates to new and useful improvements in a protecting lock for dog collars and license plates.

Heretofore it has been customary to rivet a license plate on the dog collar. It therefore is necessary that the same collar be used for the entire period of the license, except if the rivets are cut out to remove the plate.

This invention proposes a combination lock and associated structure by which a dog collar may be locked upon a dog's neck and the license plate simultaneously locked in position. With this arrangement it is possible to open the dog collar and remove the license plate and use the same license plate with any number of different collars which the dog may be supplied with.

A further object of the invention is to provide a channel shaped body into which the ends of a collar strap may be engaged and to arrange a permanent stud on the body adapted to engage through openings in the overlapping ends of the strap and upon which a license plate may be engaged, and furthermore upon which a lock may be mounted for locking these parts in position.

A further object of the invention is to arrange an element upon the body adapted to assist in holding down the license plate and which is adapted to receive the customary leash for the animal.

Still further the invention proposes an arrangement associated with the channel body and the lock to prevent the lock from being twisted around on the stud. Such twisting would be undesirable as it would be indicative of a weak construction.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:—

Fig. 1 is a side elevational view of a dog collar with a protecting lock and license plate according to this invention.

Fig. 2 is a fragmentary plan view of a portion of Fig. 1.

Fig. 3 is a fragmentary sectional view taken on the line 3—3 of Fig. 2.

Fig. 4 is a sectional view taken on the line 4—4 of Fig. 1.

Fig. 5 is a sectional view taken on the line 5—5 of Fig. 1.

Fig. 6 is a fragmentary sectional view similar to Fig. 5 but illustrating a modified arrangement.

Fig. 7 is a side elevational view of the channel shaped body used in Fig. 6.

Fig. 8 is a similar view to Fig. 6 but illustrating another modified arrangement.

Fig. 9 is a similar view to Fig. 8, showing the parts in different position.

Fig. 10 is a perspective view of the channel shaped body used in Figs. 8 and 9.

The protecting lock for a dog collar and license plate, according to this invention, includes a channel shaped body 10, and a collar strap 11 having openings 11$^a$, 11$^b$, etc., in both ends thereof and having its ends overlapping and disposed within said channel body. A stud 12 is mounted on one end of the base of said body 10 and projects through certain of the openings in the strap, as shown on the drawing, the openings 11$^a$ and 11$^b$. An element 13 is mounted on the other end of the body and is adapted to receive a leash for the dog. A license plate 14 is disposed upon the overlapping ends of the collar strap and has one end engaged beneath the element 13 and the other end formed with an opening 14$^a$ engaging on the stud 12. A lock device 15 is mounted upon the stud 12 for holding the license plate, the overlapping ends of the strap, and the channel shaped body 10 together.

The channel shaped body 10 comprises an arcuate base portion 10$^a$ from the sides of which side portions 10$^b$ project. These side portions are also of arcuate shape, as shown in Fig. 1. The collar strap 11 preferably should be of leather or other material generally used for this purpose. The stud 12 is riveted at its bottom end upon the base 10$^a$. This stud is formed with a notched head portion 12$^a$. The element 13 is in the form of a ring formed by bending a piece of wire into annular shape. The ends of this wire engage through openings 16 in lug portions 17 projecting from the sides of the side portions 10$^b$. It is these inner ends which engage over the license plate 14 and hold the end of the plate downwards.

The license plate 14 is of conventional design and construction as usually supplied by the city or State departments. The lock 15 comprises a cylindrical body 15$^a$, in the outer end of which there is a key opening 15$^b$ communicating with a slotted turnable cylinder 15$^c$. This cylinder carries a cam 15$^d$ adapted to engage a projection 15$^e$ from a bolt 15$^f$. This bolt is urged into operative position by a spring 15$^g$.

From the lock body 15$^a$ a pair of diametrically opposite arms 20 project (see Fig. 2). These arms extend into recesses 21 formed in lugs 22 extended from the side members 10$^b$. These arms, since they engage into the recesses, prevent the lock body from being twisted around the stud 12.

In Figs. 6 and 7 a modified form of a lock is illustrated. According to this form lugs 22ª project from the side portions 10ᵇ of the body of the device and these lugs are formed with openings 21ª. The lock 25 is provided with diametrically opposite bolts 25ᶠ which may be engaged into the openings 21ª. These bolts project from a lock body 25ª. This lock body has a key opening 25ᵇ. Each of the bolts 25ᶠ is urged into a retracted position. A spring 26 urges one of the bolts inwards, while another spring 27 urges the other bolt inwards. The inner ends of these bolts are formed with curved portions 28 and 28' which act as cam surfaces against which the end 12' of the stud 12 may engage. The arrangement is such that when the lock is forced upon the stud the end of the stud forces the bolts outwards. The bolts may be held in the outward position by engaging a key 29 into the key opening 25ᵇ. The key will be disposed behind an arm 30 projecting from one of the bolts 25ᶠ. Before the lock may be removed it is necessary that the key be drawn out. The key is adapted to maintain its position frictionally.

In Figs. 8 to 10 another modified form of a lock is illustrated. According to this form of the invention lugs 32 project from the side portion 10ᵇ of the body of the device and these lugs are formed with elongated rectangular opening 31ª and oval shaped opening 31ᵇ respectively. The lock 35 is provided with diametrically opposite bolts 35ᶠ and 35ᶠᶠ. The free end of the former is square in cross section, and the latter is round in cross section. These free ends may be engaged into openings 31ª and 31ᵇ respectively. These bolt ends project from the lock body 35ª. This lock body has a key opening 35ᵇ. The bolts 35ᶠ and 35ᶠᶠ are urged into a retracted position by springs 36 and 37, respectively. The inner ends of these bolts are formed with curved portions 38 and 38' respectively, which act as cam surfaces against which the stud 12 may engage. The arrangement is such that when the lock is forced upon the stud, the end of the stud forces the bolt 35ᶠᶠ outwards into opening 31ᵇ. When the key 39 is forced into the lock 35, the bolt 35ᶠ is pushed outward and held in that position when the upper projection 35ᵈ engages into a notch 39ª in key 39. In this position, the head 12ª of bolt 12 is disengaged by the portion 38 and permits the spring pressed bolt 35ᶠᶠ to slide over head 12ª and free the lock body 35ª. Then the lock 35 may be removed from the channel body.

The operation of the device is as follows:—In order to remove the dog collar and license the lock must first be removed from the stud 12. The dog license may then be removed and subsequently the overlapping ends of the dog collar may be taken off from the stud 12. The purpose of having several openings in the dog collar is to permit the collar to be placed on the dog's neck in different required sizes.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:—

1. A device of the class described, comprising a channel shaped body, a collar strap with openings in both ends and having its ends overlapping and passing through said body, a stud mounted on one end of the base of said body and projecting through certain of said openings, an element mounted on the other end of said body to which a leash may be attached, and a license plate on said overlapping ends and having one end engaged beneath said element and having its other end formed with an opening engaging said stud, and a lock on said stud.

2. A device of the class described, comprising a channel shaped body, a collar strap with openings in both ends and having its ends overlapping and passing through said body, a stud mounted on one end of the base of said body and projecting through certain of said openings, an element mounted on the other end of said body to which a leash may be attached, and a license plate on said overlapping ends and having one end engaged beneath said element and having its other end formed with an opening engaging said stud, and a lock on said stud, said channel shaped body comprising an arcuate base portion to fit the curvature of the dog's neck, and side portions projecting at right angles from the edges of said base portion.

3. A device of the class described, comprising a channel shaped body, a collar strap with openings in both ends and having its ends overlapping and passing through said body, a stud mounted on one end of the base of said body and projecting through certain of said openings, an element mounted on the other end of said body to which a leash may be attached, and a license plate on said overlapping ends and having one end engaged beneath said element and having its other end formed with an opening engaging said stud, and a lock on said stud, said stud being riveted at its bottom end on the base of said body.

4. A device of the class described, comprising a channel shaped body, a collar strap with openings in both ends and having its ends overlapping and passing through said body, a stud mounted on one end of the base of said body and projecting through certain of said openings, an element mounted on the other end of said body to which a leash may be attached, and a license plate on said overlapping ends and having one end engaged beneath said element and having its other end formed with an opening engaging said stud, and a lock on said stud, said element comprising a wire bent into the shape of a ring, and the ends of said wire engaging through lugs formed in the side portions of said body, these ends engaging over the license plate.

5. A device of the class described, comprising a channel shaped body, a collar strap with openings in both ends and having its ends overlapping and passing through said body, a stud mounted on one end of the base of said body and projecting through certain of said openings, an element mounted on the other end of said body to which a leash may be attached, and a license plate on said overlapping ends and having one end engaged beneath said element and having its other end formed with an opening engaging said stud, and a lock on said stud, said lock including a lock body, and a pair of diametrically opposite arms projecting from said body and engaging into recesses in lugs in the sides of said channel shaped body.

6. A device of the class described, comprising a channel shaped body, a collar strap with openings in both ends and having its ends overlapping and passing through said body, a stud mounted on one end of the base of said body and projecting through certain of said openings, an element mounted on the other end of said body to which a leash may be attached, and a license plate on said overlapping ends and having one end engaged beneath said element and having its other end formed with an opening engaging said stud, and a lock on said stud, said lock including a body and diametrically opposite bolts projecting from said body and adapted to engage into openings in lugs formed in the side portions of said channel shaped body.

FRANCISCO LAGO.